United States Patent [19]

Baumwoll et al.

[11] Patent Number: 5,582,046
[45] Date of Patent: Dec. 10, 1996

[54] AUTOMOTIVE VEHICLE ACCESS PREVENTIVE DEVICE

[76] Inventors: Joel P. Baumwoll, 144 W. 86th St. (#11A), New York, N.Y. 10024-4028; William L. Plumb, 680 W. End Ave., New York, N.Y. 10025; Mario Turchi, 115 River Rd. (Suite 1203), Edgewater, N.J. 07020; Ellen M. Baumwoll, 144 W. 86th St. (#11A), New York, N.Y. 10024-4028; James P. Santos, 557 High Farms Rd., Stowe, Vt. 05672; Paul D. Miller, 308 E. 79th St., New York, N.Y. 10021

[21] Appl. No.: 429,282

[22] Filed: Apr. 25, 1995

[51] Int. Cl.$^6$ ............................. B60R 25/00; E05B 65/12
[52] U.S. Cl. ................... 70/237; 70/14; 70/238; 70/162; 292/288
[58] Field of Search ............................. 70/237, 238, 209, 70/14, 225, 226, 211, 212, 30, 49, 158–164; 292/288, DIG. 69

[56] References Cited

U.S. PATENT DOCUMENTS

| | | | |
|---|---|---|---|
| 2,775,001 | 12/1956 | Bauer | 292/288 |
| 2,924,476 | 2/1960 | Deane | 292/288 |
| 4,696,172 | 9/1987 | Farrow | 70/238 |
| 4,819,461 | 4/1989 | Pearson | 70/238 |
| 5,144,821 | 9/1992 | Ernesti et al. | 70/14 |
| 5,277,043 | 1/1994 | Inashvili | 70/238 |
| 5,361,613 | 11/1994 | Fort et al. | 70/238 |
| 5,369,970 | 12/1994 | Voiculescu et al. | 70/163 |
| 5,419,165 | 5/1995 | Perkins | 292/288 |
| 5,431,461 | 7/1995 | Anderson, III et al. | 292/288 |
| 5,462,323 | 10/1995 | Benniger | 292/288 |

FOREIGN PATENT DOCUMENTS 2177058  1/1987  United Kingdom ............ 70/237

*Primary Examiner*—Darnell M. Boucher
*Attorney, Agent, or Firm*—Frishauf, Holtz, Goodman, Langer & Chick, P.C.

[57] ABSTRACT

An automotive vehicle access preventive device for use with a vehicle having a door closable against a door frame, includes a hook member adapted to engage a post on the inner surface of the door frame, and an outer module adapted to abut against an outer surface of the door. A strap is attached between the hook member and the outer module and is adapted to lie in a space between the door and the door frame. A locking bar, used in a four-door vehicle for example, includes a hook end for engaging with a rear wheel skirt of the vehicle and an opposite end connectable with the outer module. The outer module includes a roller rotatably mounted therein, with one end of the strap attached to the roller and wound thereabout, and a spring rotationally biasing the roller to wind the strap such that the strap can be tightened between the outer module and the hook member, and a restraining assembly for releasably restraining the roller to prevent loosening of the strap. The restraining assembly includes a plurality of ratchet teeth mounted for rotation with the roller, a pawl for engaging the ratchet teeth to restrain movement of the roller, a coil spring biasing the pawl into engagement with the ratchet teeth, and a slidable release device for releasing the pawl from the engagement with the ratchet teeth against the force of the spring to permit unwinding of the strap from the roller. With a locking bar installed in place, the front and rear doors cannot be opened.

33 Claims, 6 Drawing Sheets

AUTOMOTIVE VEHICLE ACCESS PREVENTIVE DEVICE

BACKGROUND OF THE INVENTION

The present invention relates generally to security devices for automotive vehicles and, more particularly, is directed to an apparatus for preventing access to the interior of the vehicle.

Because of the large number of automobile thefts, many devices have been devised for preventing a thief from escaping with the vehicle. Such devices can range from relatively complex electrical and electro-mechanical ignition cut-off switches and electronic alarms to relatively simple mechanical devices that limit rotation of the steering wheel, such as "The Club". However, these devices do not prevent a thief from gaining access to the interior of the vehicle to remove components installed in the vehicle, such as the radio, cassette tape player, airbags, electronic control module (ECM) or the like, as well as personal effects left within the vehicle. Even the alarm devices do not necessarily prevent such theft because a skillful thief can quickly remove the items before anyone responds to the alarm. Thus, even though present devices may make it more difficult for a thief to drive off with the vehicle, it is relatively easy to enter the vehicle and remove anything that it contains.

The present invention was created in view of this problem which is inherent in the prior art.

SUMMARY OF THE INVENTION

Thus, it is an object of the present invention to provide a device for preventing access by an unauthorized person to the inside of an automotive vehicle.

Another object of the present invention is to provide a device to prevent an unauthorized person from opening the doors of the vehicle.

A further object of the present invention is to provide a device for preventing unauthorized access to the inside of an automotive vehicle that can be used with existing vehicles, without modifying such vehicles.

It is yet another object of the present invention to provide a device for preventing unauthorized access to the inside of an automotive vehicle, which is easy to use and economical to manufacture.

A still further object of the present invention is to prevent uncoupling the device from inside the vehicle, such as by a person who has gained unauthorized access thereto.

One other object of the present invention is to provide a device for preventing unauthorized access to the interior of an automotive vehicle that is adjustable to fit a wide variety of vehicles.

Still another object of the present invention is to provide a visible deterrent to those intent on gaining unauthorized access to the interior of an automotive vehicle.

These and other objects of the present invention are attained in accordance with one aspect of the present invention which is directed to an automotive vehicle access preventive device for use with a vehicle having a door closable against a door frame. The device includes a hook member adapted to engage a door locking post on an inner surface of the door frame. An outer module is adapted to abut against an outer surface of the door, and a strap is attached between the outer module and the hook member. The strap is adapted to lie in a space between the door and the door frame.

The outer module includes means for tightening the strap between the outer module and the hook member to place the outer module firmly in abutment against the door as the door is in a closed position against the door frame. A lock releasably locks the tightening means to prevent loosening of the strap. The door cannot be opened unless the lock is released.

DETAILED DESCRIPTION OF THE INVENTION

Figure 1:
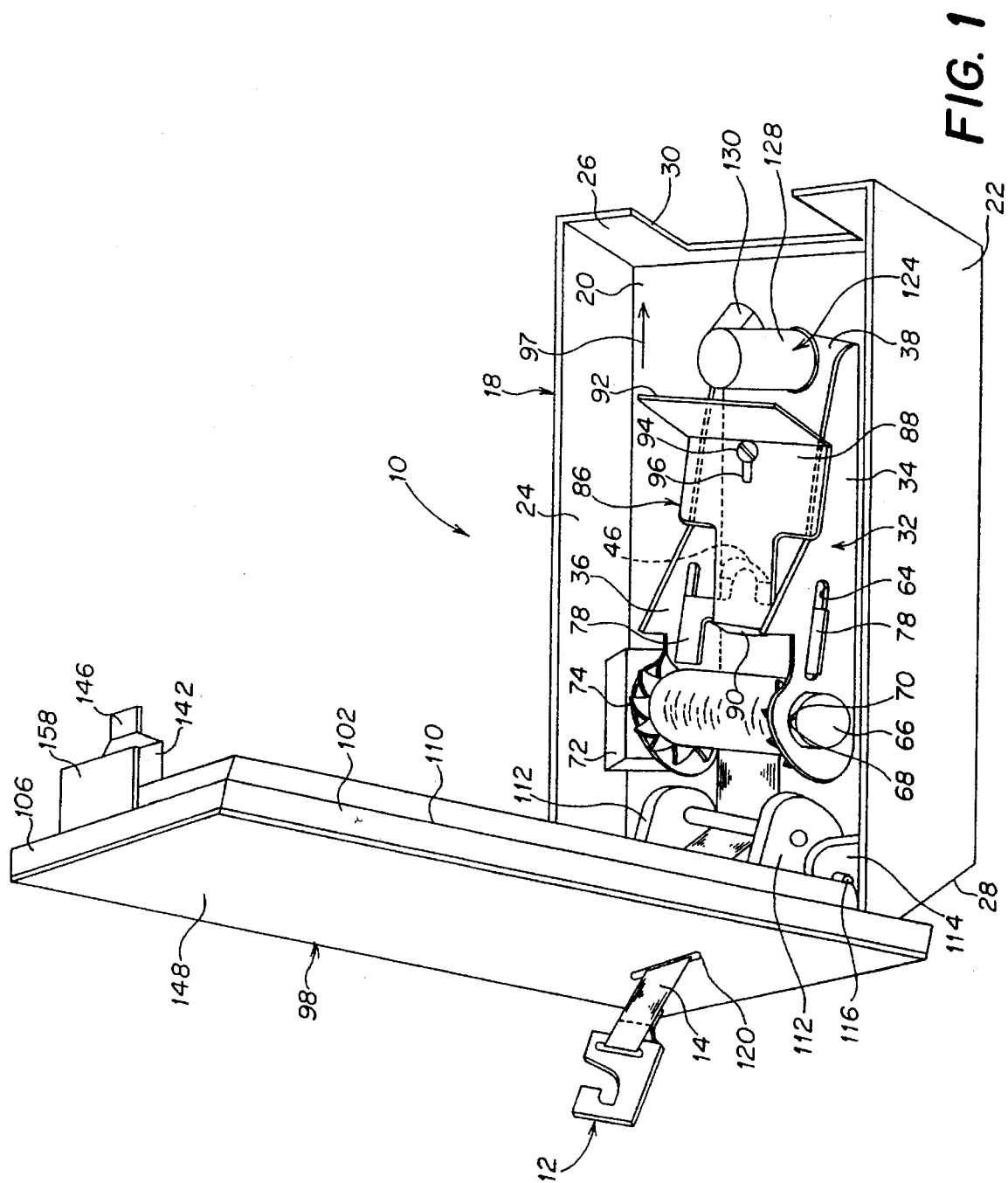
FIG. 1 is a perspective view of an automotive vehicle access preventive device according to the present invention, shown in its open position.

The present invention prevents the unauthorized opening of vehicle doors. The terms "automotive vehicle" or just "vehicle" as used herein apply to any and every type of conveyance having at least one door which is used to gain access to its interior. Typically, of course, such a vehicle would be an automobile, truck, camping trailer or mobile home. However, boats (with cabin doors), airplanes (e.g. private planes with automobile-like doors), road building equipment (e.g. tractors, cranes, backhoes) and so on are all included. The only requirements are a swinging door abuttable against a door frame member. The door frame member is a fixed part of the vehicle which serves to retain the door in its closed position. It can fully surround the door or it can be a member which comes into contact with the swingable end of the door. In an automobile, the door frame member can be a center pillar which cooperates with the door to enclose the interior. In general, the present invention provides a hook member which hooks onto a post of the door frame, and an outer module which can be secured against the outer surface of the vehicle, such as the door, when the door is in its closed position. The outer module is locked in place, as with a key. The hook member and the outer module are connected to each other by a strap which, when tightened, prevents the door from being opened because it is blocked by the outer module which, in turn, is tightly secured in place by the hook member and the taut strap therebetween. Specific details of the arrangement are provided as follows.

Referring to the drawings in detail, and initially to FIGS. 1–6 thereof, an automotive vehicle access preventive device 10 according to the present invention includes a hook member 12 for engaging post 154 (see FIG. 2) projecting from frame member 152 of an automotive vehicle, a strap 14 having one end connected with hook member 12, and an outer module 16 connected with the opposite end of strap 14 for abutting against an outside portion of the automotive vehicle and for tightening the portion of strap 14 extending between hook member 12 and outer module 16. When held in its installed position on the vehicle, strap 14 is fully contained in outer module 16 and in the space between the front door and pillar of the vehicle (see FIG. 3), thus preventing anyone from having access thereto either from inside or outside the vehicle. Strap 14 is made from a material that is highly resistant to being stretched and cut, such as the material sold under the trademark "KEVLAR". Other choices for strap 14 are a stainless steel woven material (e.g. mesh), and metallic materials integral with or coated by a polymeric material.

Figure 2:
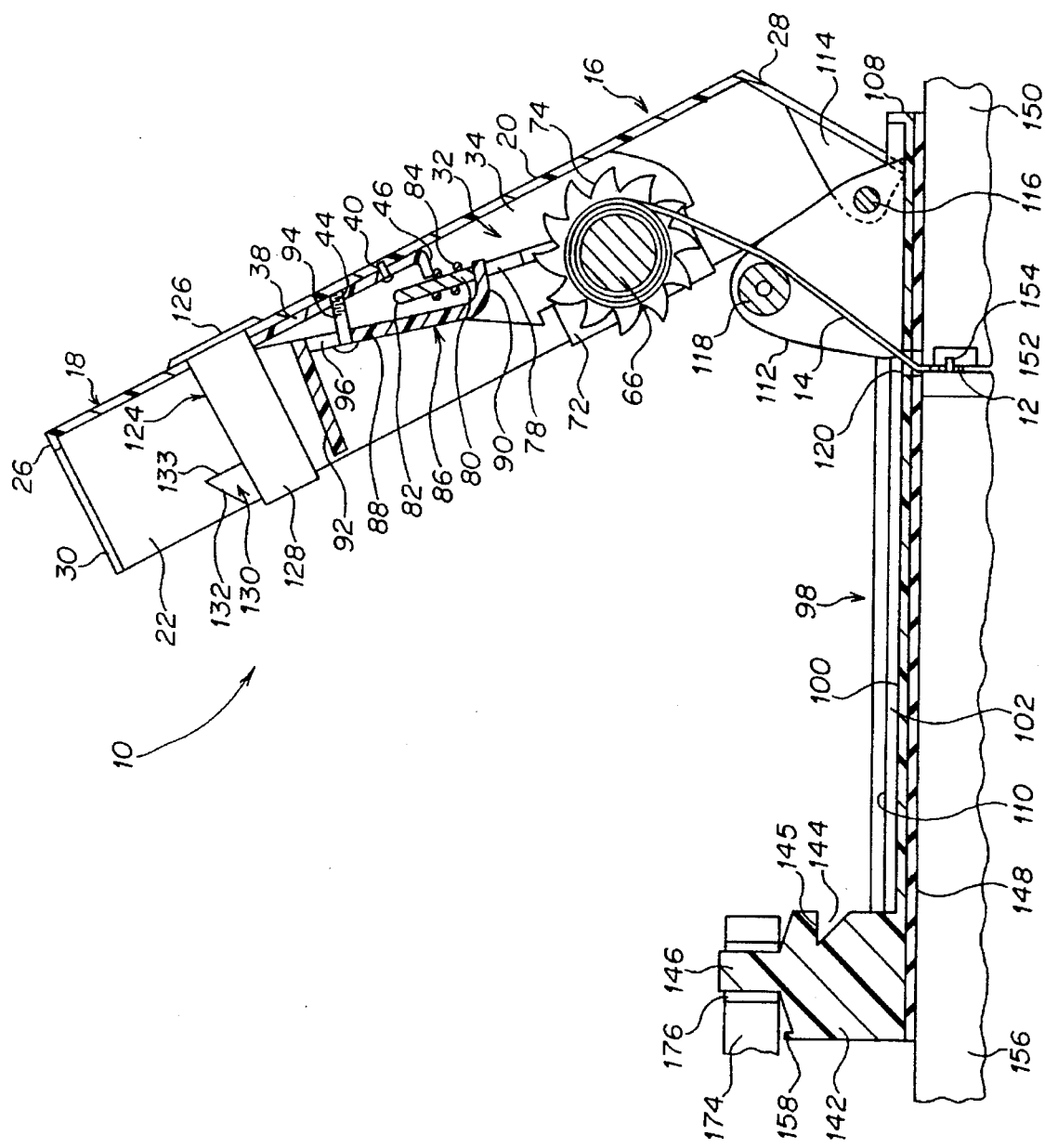
FIG. 2 is a lengthwise cross-sectional view of the automotive vehicle access preventive device of FIG. 1, shown in its open position and against the outer surfaces of the doors of a vehicle.
Figure 3:
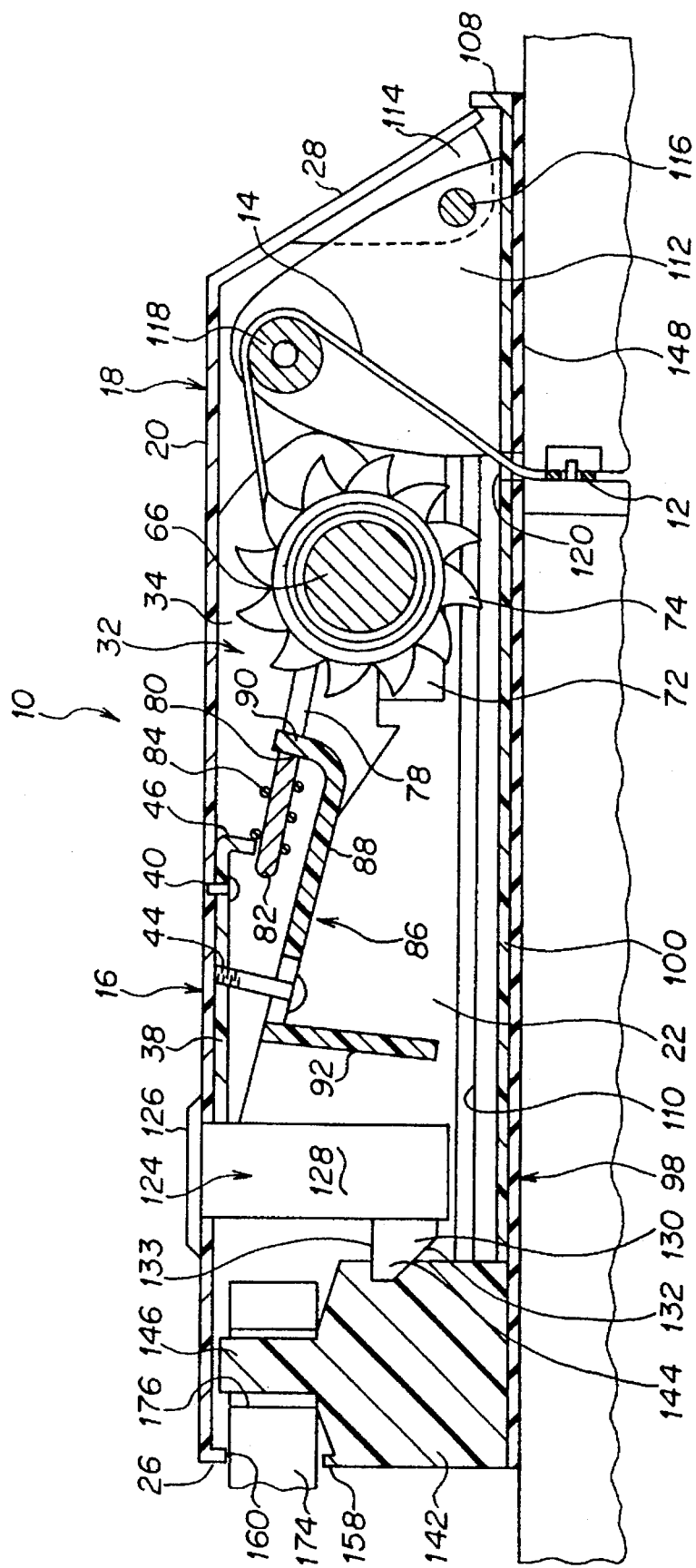
FIG. 3 is a lengthwise cross-sectional view of the automotive vehicle access preventive device of FIG. 1, shown in its closed position and against the outer surfaces of the doors of a vehicle.

Referring now more specifically to FIGS. 1–3, outer module 16 includes a generally open rectangular parallelepiped housing 18 which functions like a lid that is hinged to base 98. Housing 18 is defined by a rectangular bottom wall 20, opposite side walls 22 and 24 connected to opposite edges of bottom wall 20 and extending upwardly therefrom in an orthogonal manner, a front wall 26 connected to the front edge of bottom wall 20 and front edges of side walls 22 and 24 in an orthogonal manner, and a rear wall 28 connected to the rear edge of bottom wall 20 and rear edges of side walls 22 and 24 in a rearwardly inclined manner. (The words "rear" and "forward", and variations thereof, are used consistently herein with respect to forward being associated with the position of wall 26 and rear being associated with the position of wall 28.) It will be appreciated that the upper end of housing 18 is open. Further, front wall 26 has a cut-out portion 30 formed therein. Housing 18 is made of a material that is resistant to cutting, cracking and the like.

Figure 5:
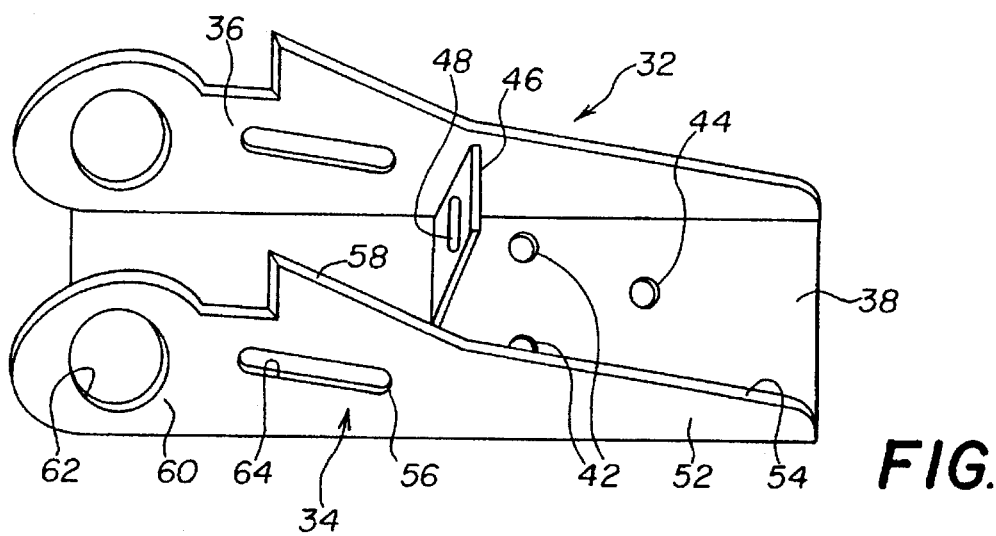
FIG. 5 is a perspective view of the mounting and guiding assembly of the automotive vehicle access preventive device of FIG. 1.
Figure 6:
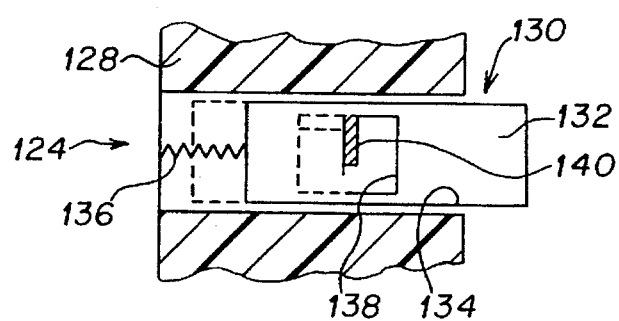
FIG. 6 is a cross-sectional view of the lock of the automotive vehicle access preventive device of FIG. 1.

A mounting and guiding assembly 32 is secured to bottom wall 20 within housing 18. As best shown in FIG. 5, mounting and guiding assembly 32 includes two parallel, spaced apart mounting and guiding walls 34 and 36 extending in the lengthwise direction of housing 18, with mounting and guiding walls 34 and 36 being connected together by a connecting wall 38 that is secured to bottom wall 20 by any suitable means, such as bolts 40 (see FIGS. 2 and 3) extending through bolt holes 42 (see FIG. 5) into bottom wall 20. A further threaded hole 44 is provided centrally in connecting wall 38, the purpose for which will become apparent from the description which follows.

As shown, connecting wall 38 extends from the front of mounting and guiding walls 34 and 36 to approximate mid-portions thereof. A guide plate 46 extends upwardly from the rearward edge of connecting wall 38 and is positioned between mounting and guiding walls 34 and 36. Guide plate 46 includes a horizontal slot 48 therethrough, the purpose for which will be understood from the description which follows.

Each mounting and guiding wall 34 and 36 includes a front wall portion 52 having an upper inclined edge 54, which leads into an intermediate wall portion 56 having an upper inclined edge 58 with a greater incline than inclined edge 54. Intermediate wall portion 56 leads into a rear mounting wall portion 60 having a circular opening 62 therein. In addition, an elongated slot 64 is formed in intermediate wall portion 56 and rear mounting wall portion 60. Elongated slot 64 extends parallel to upper inclined edge 54 but is spaced so as to be below an imaginary extension of upper inclined edge 54.

A roller 66 is positioned between mounting and guiding walls 34 and 36 and extends through circular openings 62 thereof so as to be rotatably supported therein. A bent stop pin 68 is positioned in a diametrical hole 70 at each side of roller 66 that extends laterally of its respective circular opening 62 so as to prevent axial movement of roller 66. The end of strap 14 other than the one to which hook 12 is attached is secured to roller 66. A portion of strap 14 is wrapped around roller 66.

A torsion spring assembly 72 is connected to one side of roller 66 so as to normally rotate roller 66 in the counterclockwise direction, as viewed in FIG. 1, in order to wrap strap 14 about roller 66, and make the portion of strap 14 between hook member 12 and roller 66 taut.

A restraining arrangement for selectively preventing unwinding of strap 14 from roller 66 will now be discussed. Specifically, opposite ends of roller 66 are provided with a plurality of ratchet teeth 74 therearound. A pawl member 76 is provided with pawls 78 which are slidably positioned within elongated slots 64 of mounting and guiding walls 34 and 36 so as to be positioned between a locking position in engagement with ratchet teeth 74 and an unlocking position out of engagement with ratchet teeth 74. In the locking position, roller 66 is prevented from rotating in the clockwise direction as shown in FIG. 1, which thereby prevents unwinding of strap 14. In the unlocking position, roller 66 can rotate in the clockwise direction of FIG. 1, so that strap 14 can be unwound from roller 66 and extended out of device 10.

Figure 4:
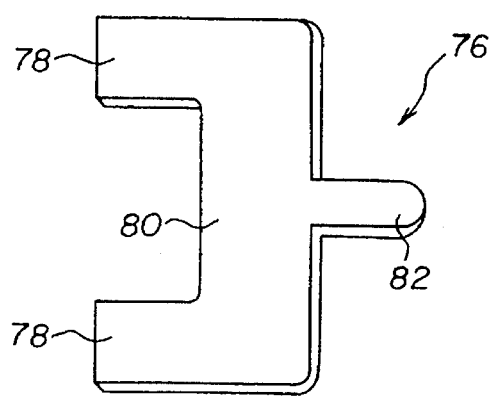
FIG. 4 is a perspective view of the pawl member of the automotive vehicle access preventive device of FIG. 1.

As best shown in FIG. 4, pawl member 76 includes two pawls 78, each adapted to be slidably mounted in a respective elongated slot 64, and a connecting bar 80 which connects together forward portions of pawls 78. Pawls 78 and connecting bar 80 thereby form a generally U-shaped configuration. A guide bar 82 extends forwardly from a center portion of connecting bar 80 and is slidably positioned within horizontal slot 48 of guide plate 46. Thus, pawl member 76 cannot escape from elongated slots 64 because its lateral motion is blocked by virtue of guide bar 82 being confined within slot 48. Further, a coil spring 84 (see FIGS. 2 and 3) is wrapped about guide bar 82 such that one end thereof is in contact with connecting bar 80 and the opposite end thereof is in contact with guide plate 46. As a result, pawl member 76 is normally biased by coil spring 84 into engagement with ratchet teeth 74 to prevent rotation of roller 66.

In order to release pawl member 76 from engagement with ratchet teeth 74, a release member 86 is provided. Specifically, release member 86 includes a guide plate 88 which rides on upper inclined edges 54, a hook edge 90 extending from the rear of guide plate 88 and which is positioned between the two pawls 78 and hooks onto the rear edge of connecting bar 80 of pawl member 76, and a finger-graspable plate 92 extending orthogonally from the front edge of guide plate 88. Release member 86 is restrained to move linearly in the lengthwise direction of housing 18 by a guide bolt 94 that extends through a lengthwise elongated slot 96 formed in guide plate 88 at a position immediately adjacent to finger grasping plate 92, with guide bolt 94 being threadedly received in threaded hole 44 in connecting wall 38 of mounting and guiding assembly 32.

Thus, when finger-graspable plate 92 is gripped by the fingers of a person and moved forward toward the front of housing 18 in the direction of arrow 97 in FIG. 1, hook edge 90 engages connecting bar 80 of pawl member 76 and causes the latter to slide forwardly within elongated slots 64, against the biasing force of coil spring 84, thereby causing coil spring 84 to compress. As a result, pawls 78 are moved out of engagement with ratchet teeth 74 to permit rotation of roller 66 in the clockwise direction of FIG. 1 when strap 14 is pulled.

A shallow, rectangular parallelepiped housing forms base 98. Base 98 is defined by a rectangular top wall 100, opposite side walls 102 connected to opposite edges of top wall 100 and extending therefrom in an orthogonal manner, a front wall 106 connected to the front edge of top wall 100 and front edges of side walls 102 in an orthogonal manner, and a rear wall 108 connected to the rear edge of top wall 100 and rear edges of side walls 102 in an orthogonal manner. It will be appreciated that opposite top wall 100, base 98 is open. Top wall 100 can have a slightly curved shape that matches that of the outer surface of the vehicle door. Base 98 is made of a material that is resistant to cutting, cracking and the like.

Further, the ends of walls 102, 106 and 108 spaced from wall 100 have a reduced thickness so as to define an outer peripheral shoulder 110. Thus, when housing 18 is closed onto base 98, edges of walls 22, 24, 26 and 28 are seated on shoulder 110, while the remaining width of walls 102, 106 and 108 extending beyond shoulders 110 fit within walls 22, 24, 26 and 28 to prevent prying open of device 10 by a thief.

Base 98 is pivotally connected with housing 18 at the rear ends thereof. In this regard, two parallel, spaced apart, somewhat triangular plates 112 extend from the inner surface of top wall 100, while two parallel, spaced apart plates 114 extend from the inner surface of rear wall 28 adjacent to plates 112. A pivot rod 116 is rotatably connected through plates 112 and 114 so as to pivotally connect base 98 and housing 18. In addition, a guide rod 118 is connected between plates 112 in offset relation to pivot rod 116, and in particular, toward the free ends of plates 112.

An elongated slot 120 is transversely formed through top wall 100 of base 98. Thus, strap 14 extends from roller 66, around guide rod 118 and through transverse elongated slot 120 out of device 10, where it is connected to hook member 12.

In order to releasably lock device 10 in the closed configuration of FIG. 3, a lock 124 is secured to the front part of bottom wall 20. Lock 124 can be a conventional lock and includes a key slot 126 positioned to the outside of outer module 16, and a substantially cylindrical housing 128 positioned to the inside of outer module 16. An inclined latch 130 having a bottom inclined surface 132 is slidably housed within an opening 134 (see FIG. 6) of cylindrical housing 128 and is normally biased out of opening 134 by a spring 136. The upper surface of latch 130 has a recess 138 therein, and a cam 140 extends into recess 138. Cam 140 is arranged to be turned by 90° with a key (not shown) inserted through key slot 126. Thus, when a key is inserted through key slot 126 and turned, cam 140 moves to the dashed line position in FIG. 6, whereby latch 130 is biased inwardly against the force of spring 136. Of course, any other conventional lock can be used.

A generally cylindrical boss 142 extends from the inner surface of top wall 100, just inwardly of front wall 106, and has a rearwardly directed triangular cut-out 144 that receives and locks latch 130 in the closed configuration of device 10. Further, a reduced diameter post 146 extends axially from the free end of boss 142, so that post 146 contacts or is close to wall 20 of housing 98 in the closed configuration of device 10. In addition, a front wall extension 158 having the same widthwise dimensions as cut-out portion 30 is formed at front wall 106 so as to fit therein. However, in the closed configuration of device 10, there is a gap 160 (see FIG. 3) between the free edge of front wall extension 158 and the bottom edge of cut-out portion 30, the purpose for which will be described hereinafter.

Thus, when cover 98 is moved from the open position of FIGS. 1 and 2 to the closed position of FIG. 3, bottom inclined surface 132 of inclined latch 130 abuts against the outer surface of boss 142. Upon continued closing movement, latch 130 is moved inwardly of cylindrical housing 128 against the force of spring 136 by the continued pressure of boss 142 on bottom inclined surface 132, until cut-out 144 is reached by the tip of latch 130, whereby spring 136 extends latch 130 into cut-out 144. In such case, the upper flat surface 133 of latch 130 abuts the flat surface 145 of cut-out 144 to prevent opening pivotal movement of housing 18 relative to base 98. In such position, the only way to pivotally open housing 18 is to insert a key through key slot 126 and turn the same so as to cause latch 130 to be moved inwardly of cylindrical housing 128, thereby clearing boss 144.

A protective sheet 148 made of an elastomeric material or other material which non-damaging to the outer surface of the vehicle against which it abuts, such as neoprene or the like, is secured to the outer exposed surface of wall 100. Protective sheet 148 will firmly bear against the outer surface of the vehicle, but will not damage or mar the vehicle. It is preferable to make sheet 148 out of a high friction material to minimize the potential for rotational movement of device 10 under manual force applied thereto.

It should be understood that an automotive vehicle, particularly an automobile, has a front door 150 (see FIG. 2) behind which the frame member 152 is conventionally shaped like a center pillar. This frame member 152, which has been called a pillar herein for the sake of convenience, typically includes a post 154 or a U-shaped bracket which is latched to a locking mechanism on a corresponding part of the door when door 150 is closed. If on a particular vehicle insufficient clearance is provided to accommodate hook member 12 in the area of the door locking mechanism, then the pillar may have to be provided with a retrofitted bracket installed away from the locking mechanism. The use herein of the term "post" is intended to collectively cover the post 154, a U-shaped bracket as part of the door locking mechanism, and the retrofitted pillar with a special bracket.

Installment and operation of automotive vehicle access preventive device 10, according to a first embodiment of the present invention, will now be described. This explanation is provided in connection with a four door automobile. The front door 150 and rear door 156 on each side are separated by pillar 152. Front door 150 abuts against pillar 152, typically via a rubberized gasket (not shown) to create a waterproof seal. Rear door 156 typically is hingeably attached to pillar 152.

Of course, it is readily apparent that in order to protect the interior of the vehicle against unauthorized entry, one device 10 is required for each side of the automobile.

With front door 150 of the vehicle open and rear door 156 closed, hook member 12 is hooked onto post 154. Thus, strap 14 extends through the open doorway and against the side of pillar 152. Finger grasping plate 92 is then engaged by the fingers of a person and moved in the direction of arrow 97 in FIG. 1, toward the front of housing 18, whereby hook plate 90 engages connecting bar 80 of pawl member 76 and causes the latter to slide forwardly within elongated slots 64, against the biasing force of coil spring 84, thereby causing coil spring 84 to compress. As a result, pawls 78 are moved out of engagement with ratchet teeth 74 to permit rotation of roller 66 in the clockwise direction of FIG. 1. The user then pulls outer module 16 outwardly of the vehicle, whereby strap 14 is unwound from roller 66 by an amount sufficient to permit closure of door 150. As door 150 is closed, strap 14 and hook member 12 are trapped between door 150 and pillar 152. Of course, housing 18 has been flipped up to its open position in order to enable strap 14 to be loosened.

After front door 150 has been closed and finger grasping plate 92 is released, coil spring 84 forces pawl member 76 to slide rearwardly within elongated slots 64, into engagement with ratchet teeth 74 to prevent rotation of roller 66 in the clockwise direction of FIG. 1, and thereby prevent further unwinding of strap 14. Of course, as with a conventional ratchet mechanism, ratchet teeth 74 are shaped to permit counter-clockwise rotation of roller 66, as viewed in FIG. 1. Thus, torsion spring assembly 72 causes such rotation of roller 66, thereby winding strap 14 onto roller 66, whereby outer module 16 is pulled into engagement with the vehicle. In such position, protective sheet 148 of rubber material is positioned in contact with the outer door surface of the vehicle. In particular, device 10 extends across pillar 152 and is in contact with the outer door surface of doors 150 and 156.

It must be understood that at this point housing 18 is in its open position with base 98 abutting the vehicle doors and pillar area, and with strap 14 having been pulled into a taut condition by torsion spring assembly 72. However, strap 14 is not yet pulled so tight that it prevents movement of base 98 relative to the vehicle either along the vehicle surface or away therefrom. In fact, it may even be possible to move the doors somewhat in response to an applied opening force.

With housing 18 being in its open position, roller 66 is positioned a predetermined distance from guide rod 118 so that the length of strap 14 extending between the two is "X". Housing 18 is then closed against base 98 to be in the configuration depicted in FIG. 3. As a result, the distance between roller 66 and guide rod 118 increases so that the length of strap 14 therebetween is greater than "X", whereby strap 14 is pulled even more taut by the closure of housing 18. Of course, as described above, strap 14 cannot unwind from roller 66 due to ratchet teeth 74 being engaged by pawl member 76. As a result, all the play in strap 14 is removed by closure of housing 18, and outer module 16 is pressed very firmly against the vehicle.

Thus, even if the door lock is picked or a thief breaks the window, it will be impossible to open at least the front door 150. This is because outer module 16 is tightly held against the outside of the front door. The only way to open the door is to insert the key into key slot 126 and open housing 18 relative to base 98, thereby allowing the user to pull finger grasping plate 92 and release roller 66 so as to unwind strap 14 and pull outer module 16 away from the vehicle.

Front door 150 is prevented from being opened by the portion of device 10 which extends forwardly of pillar 152. Rear door 156 is prevented from being opened by a locking bar 162 as described below. Of course, in a two-door vehicle for example, locking bar 162 is not necessary.

The overall length of device 10 for an automotive vehicle is such that it extends laterally of the slot between the front door and the pillar to block opening of the front door. Once device 10 is assembled and locked in place on the automotive vehicle, outer module 16 lies flush against front door 150. This feature combined with the absence of openings in housing 18, except for key slot 126, prevents the insertion of tools to force device 10 to open and to thereby deny access to strap 14 for the purpose of cutting or at least loosening it.

In addition to the above, and for providing security in a four-door vehicle where opening of a door behind pillar 152 is to be prevented, a locking bar 162 is preferably connected with outer module 16. Specifically, as shown in FIGS. 2, 3, 7 and 8, locking bar 162 includes an outer telescoping member 164 which is closed by an end wall 166 at one end and is open at the opposite end 168. An end cap 170 is connected to end wall 166 within telescoping member 164 and a threaded rod 172 has one end fixed to end cap 170 and axially extends within outer telescoping member 164. A flat projection 174 extends axially from the outer face of end wall 166 and includes an eyelet 176 therein. Flat projection 174 fits within cut-out portion 30 such that eyelet 176 receives reduced diameter boss 146 therein. In the closed configuration of device 10, as shown in FIG. 3, flat projection 174 closes gap 160 since it has similar dimensions thereto.

Locking bar 162 further includes a cane shaped inner telescoping member 178 that fits within the open end 168 of outer telescoping member 164. Specifically, inner telescoping member 178 includes a straight portion 180 that fits within outer telescoping member 164 and a curved portion 182 as a continuation at the opposite end of straight portion 180. The free end of straight portion 180 has a threaded cap 184 secured thereto, with an inner threaded opening 186 for threadedly receiving threaded rod 172. Thus, inner telescoping member 178 can be rotated relative to outer telescoping member 164, and during such rotation, inner telescoping member 178 is forced to move inwardly or outwardly of outer telescoping member 164 to shorten or lengthen locking bar 162.

Figure 7:
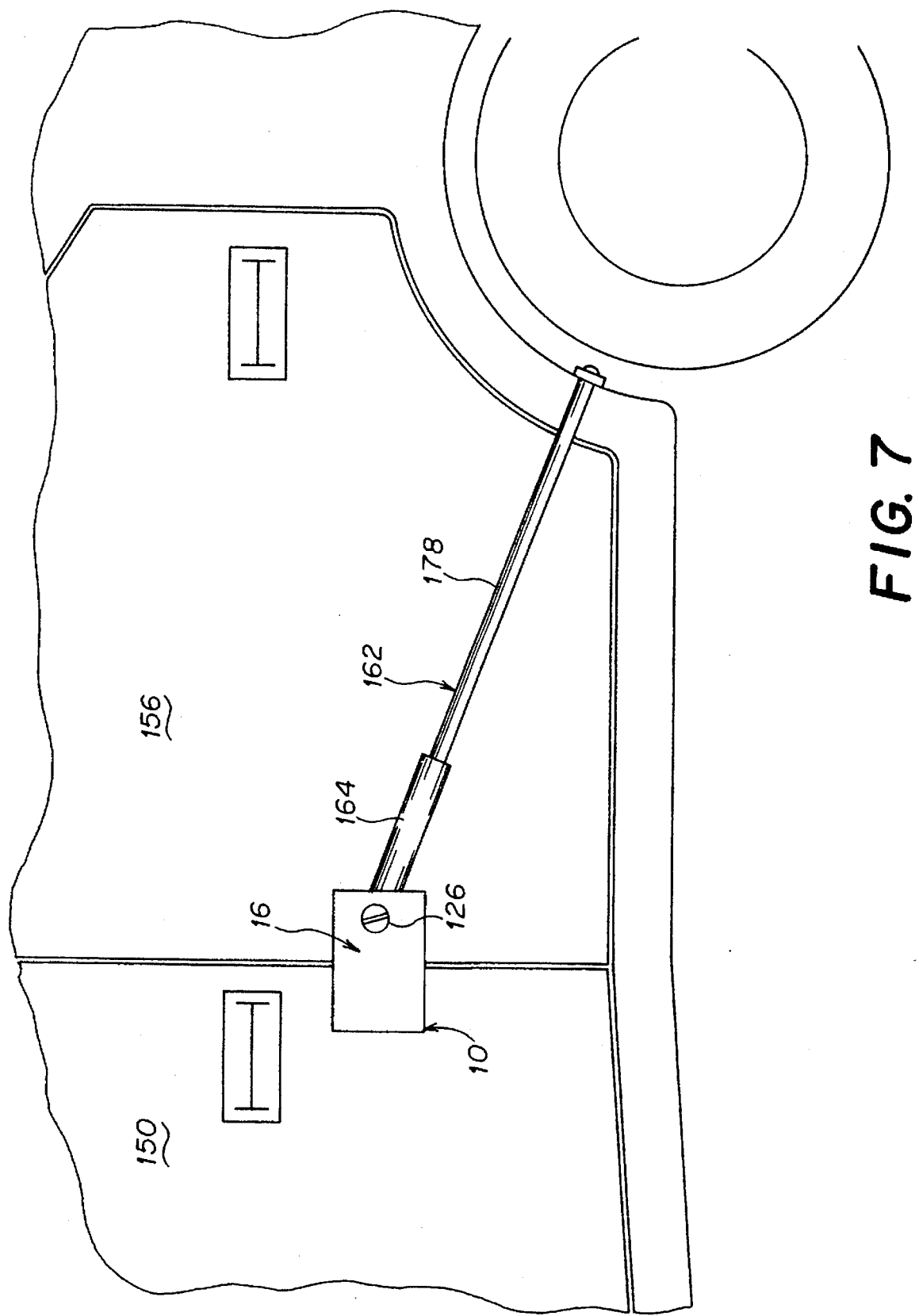
FIG. 7 is a side elevational view of an automobile to which is secured the automotive vehicle access preventive device according to the present invention, showing the outer module and locking bar thereof.

In use, the length of locking bar 162 is first adjusted to a desired length by relative rotation of inner telescoping member 178 and outer telescoping member 164. Then, curved portion 182 is placed around the rear wheel skirt of the vehicle, as shown in FIG. 7, and flat projection 174 is positioned within cut-out portion 30 so that eyelet 176 receives reduced diameter boss 146. Then, when outer module 16 is held taut against the vehicle doors, outer module 16 is closed to the configuration of FIG. 3 in order to restrain locking bar 162 therein. Thus, locking bar 162 functions as an additional theft deterrent since it is placed entirely across rear door 156. With locking bar 162 positioned in place, rear door 156 is securely retained in its closed condition even if it is unlocked and strong opening forces are applied to it. Some motion of rear door 156 is acceptable with locking bar 162 in place, as long as such motion is insufficient to enable someone to reach into or enter the automobile. Locking bar 162 is made of materials that strongly resist breakage, cutting and bending. For example, one such material is the metal used to constitute the product sold under the trademark "The Club". Various steels and other metals as well as some reinforced polymers can also be used.

Figure 8:
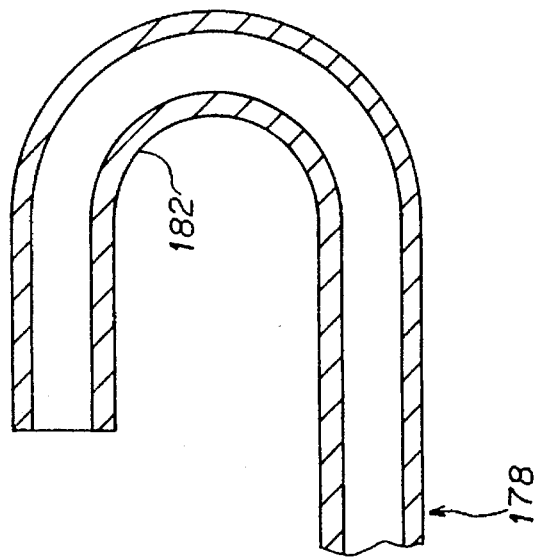
FIG. 8 is a longitudinal cross-sectional view of the locking bar of FIG. 7.
Figure 8:
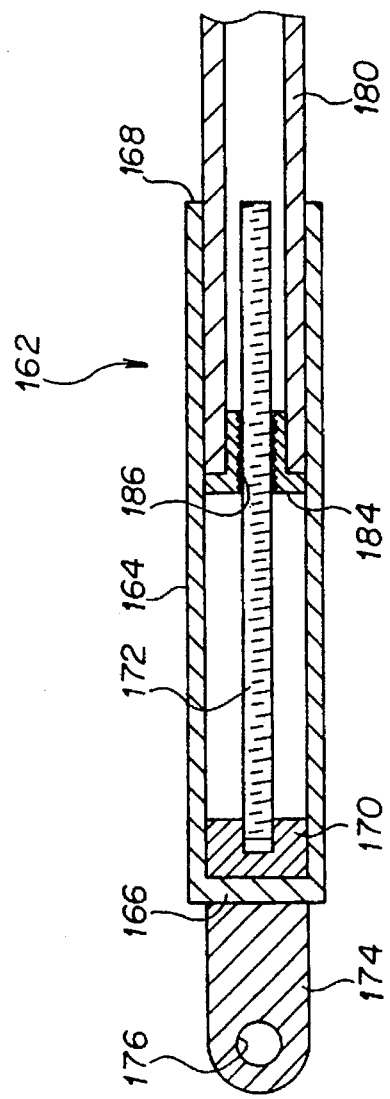

It will be appreciated that any other arrangement of providing an adjustable telescoping arrangement of locking bar 162 can be provided instead of the screw threaded— arrangement of FIG. 8.

Of course, it will be appreciated that, if locking bar 162 is eliminated, so that only outer module 16 provides the theft deterrence (e.g. if the vehicle is a two-door type), reduced diameter boss 146, cut-out portion 30 and front wall extension 158 should be eliminated to block access therethrough to the interior of device 10.

Having described specific preferred embodiments of the invention with reference to the accompanying drawings, it will be appreciated that various modifications thereto can be effected by one of ordinary skill in the art without departing from the scope or spirit of the invention, as defined by the following claims.

We claim:

1. An automotive vehicle access preventive device for use with a vehicle having a door closable against a door frame with a post extending from an inner surface of the door frame, comprising:

a hook member adapted to engage the post on the inner surface of the door frame;

an outer module adapted to abut against an outer surface of the door;

a strap attached to said hook member and said outer module and adapted to lie in a space between the door and the door frame; and said outer module including:

a cover pivotally attached to a base;

means for tightening said strap between said outer module and said hook member to a preliminary tension for removing slack in the strap, while said cover is stationary relative to said base, to keep said outer module in abutment against the door as the door is in a closed position against said door frame;

restraining means for releasably restraining said tightening means to prevent loosening of said strap from said preliminary tension; and means for further tightening said strap beyond said preliminary tension as said cover is pivoted toward said base to close said outer module.

2. An automotive vehicle access preventive device according to claim 1, wherein said tightening means includes take-up means for accommodating a selective length of said strap within said outer module so as to adjust the strap length between said outer module and said hook member.

3. An automotive vehicle access preventive device according to claim 1, wherein said strap is made of a material that is highly resistant to being cut and stretched.

4. An automotive vehicle access preventive device according to claim 1, wherein said outer module extends laterally of said space between the door and the door frame so as to block opening of the door.

5. An automotive vehicle access preventive device according to claim 1, wherein all of said strap which extends outside of said vehicle is concealed within said outer module.

6. An automotive vehicle access preventive device according to claim 1, wherein said outer module has a surface that abuts against said outer surface of the door and has a shape matched thereto.

7. An automotive vehicle access preventive device according to claim 1, wherein said outer module has an exterior shaped to be smooth and a periphery engaged with the outer surface of said door whereby a tool cannot be inserted to pry the outer module open.

8. An automotive vehicle access preventive device according to claim 1, wherein said tightening means includes:

a roller rotatably mounted in said outer module, with one end of said strap attached to said roller and wound thereabout; and spring means for rotationally biasing said roller to wind said strap.

9. An automotive vehicle access preventive device according to claim 8, wherein said restraining means includes:

a plurality of ratchet teeth mounted for rotation with said roller;

pawl means for engaging with said ratchet teeth to restrain movement of said roller;

biasing means for biasing said pawl means into engagement with said ratchet teeth; and release means for releasing said pawl means from said engagement with said ratchet teeth against the force of said biasing means to permit unwinding of said strap from said roller.

10. An automotive vehicle access preventive device according to claim 9, wherein said outer module includes guide means for guiding said pawl means between a first position in engagement with said ratchet teeth and a second position out of engagement with said ratchet teeth.

11. An automotive vehicle access preventive device according to claim 10, wherein said guide means includes a guiding wall having a slot therein through which said pawl means extends, for limiting movement of said pawl means between said first and second positions.

12. An automotive vehicle access preventive device according to claim 10, wherein:

said guide means includes two parallel, spaced apart guiding walls, each having a slot therein; and said pawl means includes two pawl plates slidably positioned in said slots, and a connecting plate which connects together said two pawl plates.

13. An automotive vehicle access preventive device according to claim 12, wherein said outer module includes a bottom wall;

wherein said pawl means includes a guide bar extending from said connecting plate;

further comprising a guide plate connected to said bottom wall and extending up therefrom, said guide plate having an opening therein for slidably receiving said guide bar of said pawl means therethrough; and wherein said biasing means includes a coil spring surrounding said guide bar and positioned between said guide plate and said connecting bar for biasing said pawl means into engagement with said ratchet teeth.

14. An automotive vehicle access preventive device according to claim 12, wherein said release means includes:

a release plate slidably mounted on said parallel, spaced apart guiding walls for movement therealong;

hook means connected with said release plate for engaging with said connecting plate; and grasping means connected with said release plate for moving said release plate along said guiding walls such that said hook portion moves said pawl means out of engagement with said ratchet teeth against the force of said biasing means.

15. An automotive vehicle access preventive device according to claim 14, further comprising guiding and limiting means for guiding movement of said release plate in a predetermined direction and within a predetermined range of motion.

16. An automotive vehicle access preventive device according to claim 15, wherein said guiding and limiting means includes a slot in said release plate and fixed bolt means extending through said slot for guiding and limiting movement of said release plate.

17. An automotive vehicle access preventive device according to claim 9, wherein said release means includes:
 a release plate slidably mounted in said outer module;
 hook means connected with said release plate for engaging with said pawl means; and
 grasping means connected with said release plate for moving said release plate such that said hook portion moves said pawl means out of engagement with said ratchet teeth against the force of said biasing means.

18. An automotive vehicle access preventive device according to claim 9, wherein said cover has a recess therein, said means for tightening and said restraining means being secured within said recess;
 a pivot assembly within said recess which pivotally mounts said cover to said base; and
 a locking assembly for releasably locking said cover and said base in a closed configuration such that said cover and said base provide a substantially smooth, continuous surface in a closed configuration of said outer module.

19. An automobile vehicle access preventive device according to claim 18, wherein said means for further tightening said strap includes a guide rod on said pivot assembly which increases in distance from said roller when said cover is moved to close said outer module, and around which said strap is guided so as to provide said tension to said strap beyond said preliminary tension when said outer module is in said closed configuration.

20. An automotive vehicle access preventive device according to claim 1, wherein said cover has a recess therein, said means for tightening and said restraining means being secured within said recess;
 a pivot assembly within said recess which pivotally mounts said cover to said base; and
 a locking assembly for releasably locking said cover and said base in a closed configuration such that said cover and said base provide a substantially smooth, continuous surface in a closed configuration of said outer module.

21. An automotive vehicle access preventive device according to claim 20, wherein said base includes an elongated slot through which said strap extends.

22. An automotive vehicle access preventive device according to claim 21, wherein said outer module includes a protective surface on said base which abuts against said door, said protective surface including an elongated slot in alignment with said elongated slot of said base and through which said strap extends.

23. An automotive vehicle access preventive device according to claim 1, further comprising a locking bar including a hook end for engaging with a rear wheel skirt of the vehicle and an opposite end connectable with said outer module so as to extend across a rear door of the vehicle.

24. An automotive vehicle access preventive device according to claim 23, wherein said outer module includes a boss therein, and an opening adjacent to said boss; and said opposite end of said locking bar includes an eyelet extending through said opening and receiving said boss.

25. An automotive vehicle access preventive device according to claim 23, wherein said locking bar includes an outer telescoping member and an inner telescoping member movable axially within said outer telescoping member between a plurality of lockably fixed positions.

26. An automotive vehicle access preventive device according to claim 25, wherein said inner telescoping member is threadedly engaged within said outer telescoping member so as to vary the length of said locking bar by relative rotation of said inner and outer telescoping members so that said inner telescoping member is movable axially within said outer telescoping member between said plurality of fixed positions.

27. An automotive vehicle access preventive device for use with a vehicle having a door closable against a door frame with a post extending from an inner surface of the door frame, comprising:
 a hook member adapted to engage the post on the inner surface of the door frame;
 a cover pivotally attached to a base;
 a winding roller rotatably mounted in said cover;
 a strap attached at one end to said winding roller, and at another end to said hook member, and passing through an opening in said base;
 a plurality of ratchet teeth on said winding roller operatively associated with a pawl biassed to engage said ratchet teeth for preventing rotation of said winding roller to unwind said strap; and
 a camming member mounted in one of said cover and said base and around which said strap is wrapped for tightening said strap when the cover is pivoted toward said base relative to when the cover is pivoted away from said base.

28. The automobile vehicle access preventive device according to claim 27, wherein said camming member is mounted in said base.

29. The automobile vehicle access preventive device according to claim 28, wherein said roller is at a first position when the cover is open, and at a second position when the cover is closed, said camming member being closer to said first position than to said second position.

30. The automobile vehicle access preventive device according to claim 27, further comprising a torsion spring biased for rotating said winding roller to wind said strap onto it.

31. The automobile vehicle access preventive device according to claim 30, further comprising a releasing member connected to said pawl for manually disengaging said pawl from said ratchet teeth.

32. A method to prevent access to an automotive vehicle which has a door closeable against a door frame with a post extending from an inner surface of the door frame, comprising the steps of:
 providing a module having a base pivotally attached to a cover, with a strap being attached to a roller in the cover and passing through an opening in said base;
 engaging the post on the inner surface of the door frame with a hook member at another end of the strap;
 then closing the door such that the strap lies in a space between the door and the door frame;
 then placing said base in abutment against the door;
 then taking up slack in the strap by rotating said roller in one direction to develop a preliminary tension in the strap;
 then preventing a loosening of said strap below said preliminary tension by rotation of said roller in an opposite direction;
 then pressing against said strap with a camming member as said cover is closed against said base to provide further tightening beyond said preliminary tension.

33. The method of claim 30, further comprising the step of moving the cover to an open position by pivoting it away from the base, said preliminary tension being developed at said open position of said cover.

\* \* \* \* \*